(12) United States Patent
Jamison et al.

(10) Patent No.: US 6,397,718 B2
(45) Date of Patent: *Jun. 4, 2002

(54) DEVICE FOR REDUCING THE ECCENTRICITY AND NON-UNIFORMITIES AMONG CARTRIDGE CASES

(75) Inventors: John R. Jamison, P.O. Box 691, Springfield, OR (US) 97477; Bradley R. Elder, Eugene, OR (US)

(73) Assignee: John R. Jamison, Springfield, OR (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/567,239

(22) Filed: May 11, 2000

(51) Int. Cl.[7] ................................................ F42B 33/10
(52) U.S. Cl. ................................. 86/19.7; 86/23; 86/24; 86/28; 86/37
(58) Field of Search ......................... 29/1.3, 1.31, 1.32; 86/23, 24, 32, 33, 36, 37, 38, 44, 28

(56) References Cited

U.S. PATENT DOCUMENTS

| | | | | |
|---|---|---|---|---|
| 2,406,170 A | * | 8/1946 | Smiley | 29/1.32 |
| 2,443,807 A | * | 6/1948 | Smiley | 29/1.32 |
| 2,744,307 A | * | 5/1956 | Smiley | 29/1.32 |
| 3,174,390 A | | 3/1965 | Jacobsen | 86/24 |
| 3,429,218 A | * | 2/1969 | Olson | 86/24 |
| 3,818,563 A | | 6/1974 | Beaulieu | 29/1.32 |
| 3,863,529 A | | 2/1975 | Bolen | 82/47 |
| 3,908,253 A | | 9/1975 | Bolen | 29/1.32 |
| 4,686,751 A | | 8/1987 | Gracey | 29/1.32 |
| 4,723,472 A | | 2/1988 | Lee | 86/24 |
| 4,807,511 A | | 2/1989 | Markle | 86/24 |
| 4,813,827 A | | 3/1989 | Dugger | 408/211 |
| 4,860,453 A | * | 8/1989 | Carroll | 29/1.32 |
| 5,064,320 A | | 11/1991 | Markle | 408/202 |
| 5,066,174 A | * | 11/1991 | Smith | 86/37 |
| 5,088,169 A | | 2/1992 | Touzet | 29/1.32 |
| 5,125,316 A | | 6/1992 | Markle | 86/24 |
| 5,309,801 A | | 5/1994 | Markle | 82/128 |
| 5,497,539 A | | 3/1996 | Blodgett | 29/1.32 |
| 5,649,464 A | | 7/1997 | Gracey | 86/36 |
| 5,727,295 A | | 3/1998 | Gracey | 29/1.32 |
| 5,788,429 A | | 8/1998 | Gracey | 408/80 |

* cited by examiner

*Primary Examiner*—Harold J. Tudor
(74) *Attorney, Agent, or Firm*—Law Office of Timothy E. Siegel; Timothy E. Siegel

(57) ABSTRACT

A device for machining a cartridge case that has a neck comprising a circular neck wall, a mouth and a primer pocket. The device includes a gripping assembly, adapted to accept and retain a cartridge case and a neck machining assembly, positioned to engage the cartridge case from a first direction and adapted to machine the neck of the cartridge case. Additionally, a primer pocket machining assembly is positioned to engage the cartridge case from a second direction, opposed to the first direction, thereby permitting simultaneous primer pocket and neck engagement, and adapted to machine the primer pocket.

11 Claims, 5 Drawing Sheets

DEVICE FOR REDUCING THE ECCENTRICITY AND NON-UNIFORMITIES AMONG CARTRIDGE CASES

BACKGROUND OF THE INVENTION

The key to accurate ammunition is concentricity and uniformity in every respect. Cartridge cases received directly from a manufacturer typically bear non-uniformities and eccentricities from piece to piece that can affect the potential accuracy of the ammunition. Competitive marksmen usually rework each cartridge case in order to produce ammunition with greater concentricity and uniformity and hence the potential for improved accuracy.

A typical prior art cartridge case 10 is shown in FIG. 7. A bullet (not shown) is held in place by the cartridge neck 14 (terminating in a mouth 15) of the cartridge case 10. An extractor groove 19 circumscribes the cartridge case 10 near its bottom. A primer pocket 18 contains a primer, which ignites when struck by the firing pin of the gun being used. A flash hole 20 connects the primer pocket 18 with the propellant chamber 22, so that the ignited primer will ignite the propellant contained in chamber 22 thereby forcing the bullet (not shown) out of the neck 14.

Among the non-uniformities typically present from one cartridge case 10 to another cartridge case 10 is the size and shape of the flash hole 20, which is sometimes partially occluded by burrs extending from the inner perimeter of the flash hole 20. Even a small difference between flash holes 20 can affect the ignition, chamber pressure, and velocity uniformity, which in turn affect the uniformity and accuracy of the ammunition. Moreover, any non-uniformity between primer pockets 18 will affect the propellant ignition uniformity by altering the contact of the primer with the bottom of the primer pocket, thereby changing the firmness of primer seating and the firing pin-to-primer relationship, which in turn affects ignition characteristics and ammunition uniformity.

Non-uniformities in the form of wall thickness variations at the neck 14 and the mouth 15 of the cartridge case also affect the neck/bullet/rifle chamber concentricity, bullet alignment in the bore of the firearm, and accuracy of the ammunition. Any variation in the thickness of different portions of the circumference of the neck may cause the bullet to be held in misalignment with a firearm's bore, forcing the bullet into an imperfect shape under chamber pressure when fired. Non-uniformities and eccentricities of this type from cartridge case to cartridge case cause accuracy to deteriorate.

SUMMARY

In a first separate aspect, the present invention comprises a device for machining a cartridge case that has a neck comprising a circular neck wall, a mouth and a primer pocket. The device comprises a gripping assembly, adapted to accept and retain a cartridge case and a neck machining assembly, positioned to engage the cartridge case from a first direction and adapted to machine the neck of the cartridge case. Additionally, a primer pocket machining assembly is positioned to engage the cartridge case from a second direction, opposed to the first direction, thereby permitting simultaneous primer pocket and neck engagement, and adapted to machine the primer pocket.

In a second separate aspect, the present invention is a device for machining a cartridge case that has a neck, a mouth and a primer pocket. The device comprises a gripping assembly, adapted to accept and retain a cartridge case and a neck machining assembly, adapted to machine the neck of the cartridge case. In addition, a mouth machining assembly has a fixed positional relationship to the neck machining assembly so that the mouth machining assembly engages and machines the mouth of the cartridge simultaneously to the machining of the neck of the cartridge case by the neck machining assembly.

The foregoing and other objectives, features and advantages of the invention will be more readily understood upon consideration of the following detailed description of the invention, taken in conjunction with the accompanying drawings.

DETAILED DESCRIPTION OF THE PREFERRED EMBODIMENT

Figure 1:
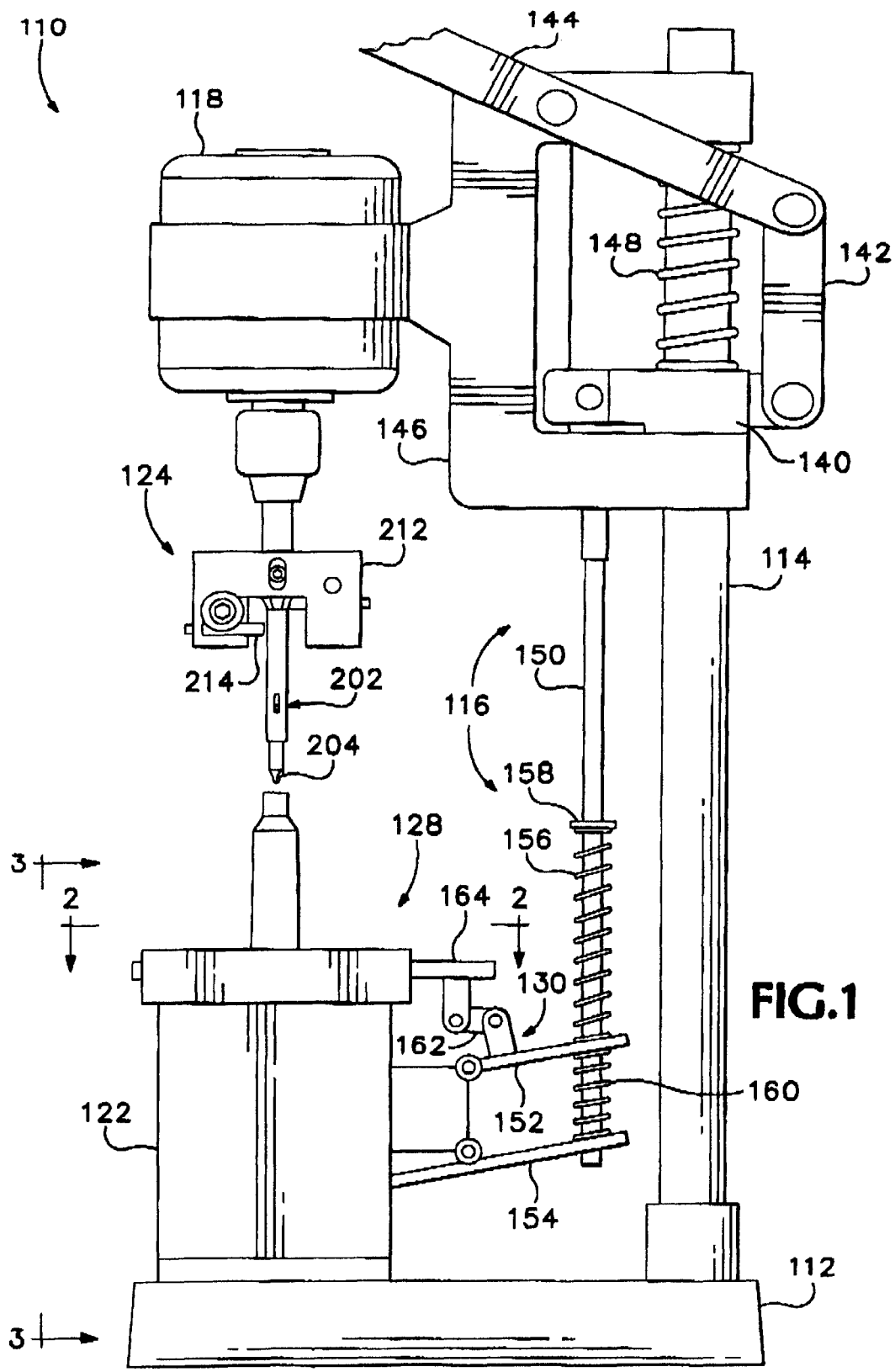
FIG. 1 is a side view of cartridge case enhancement machine according to the present invention, holding a cartridge case.

Referring to FIG. 1, a cartridge case machining device 110 according to the present invention includes a base 112 and a vertical shaft 114 supported by the base. An actuating assembly 116 permits a user to simultaneously move a top electric motor 118 and a bottom electric motor 120 (FIGS, 5 and 6) in bottom motor housing 122. The top electric motor 118 drives a top-machining unit 124 and the bottom electric motor drives a primer pocket reamer 126 (FIGS. 2, 3, 5 and 6). A cartridge case retention assembly 128 accepts the cartridge case 10 and is caused to grip the cartridge case 10 during machining by a linkage 130 to the actuating assembly 116.

The actuating assembly 116 is fixedly attached to the vertical shaft 114 by way of a fixed clamp 140 to which a linkage 142 is hinged. In turn, an actuating member in the form of a top lever 144 is hinged to both linkage 142 and to a carriage 146 that is slideably mounted to vertical shaft 114. A spring 148 urges carriage 146 to the upper limit of its range of movement. Upper motor 118 is fixedly mounted to carriage 146.

Figure 2:
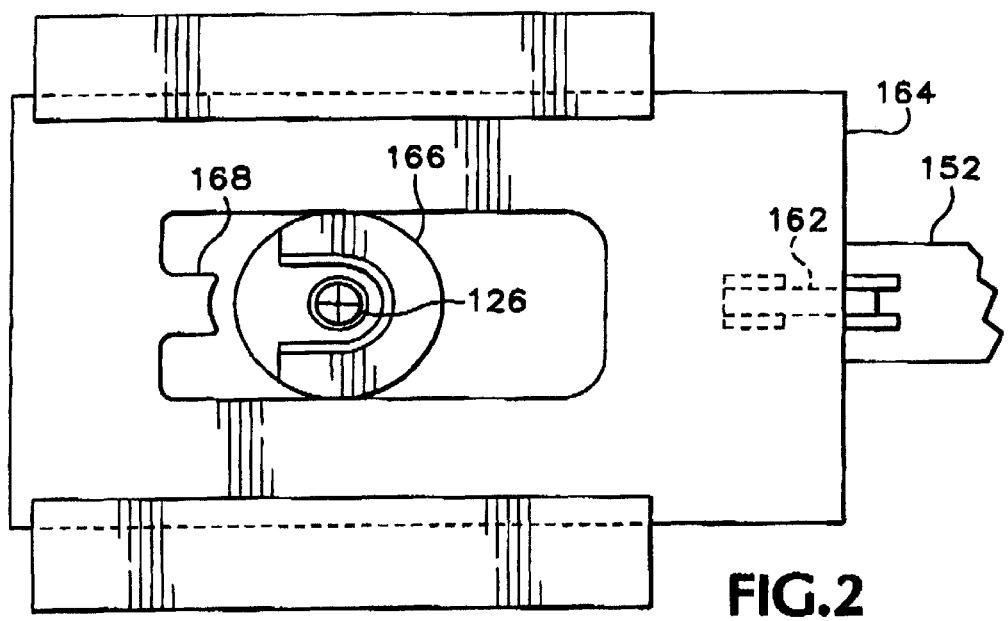
FIG. 2 is a partial plan view of the machine of FIG. 1 taken along line 2—2 of FIG. 1.
Figure 3:
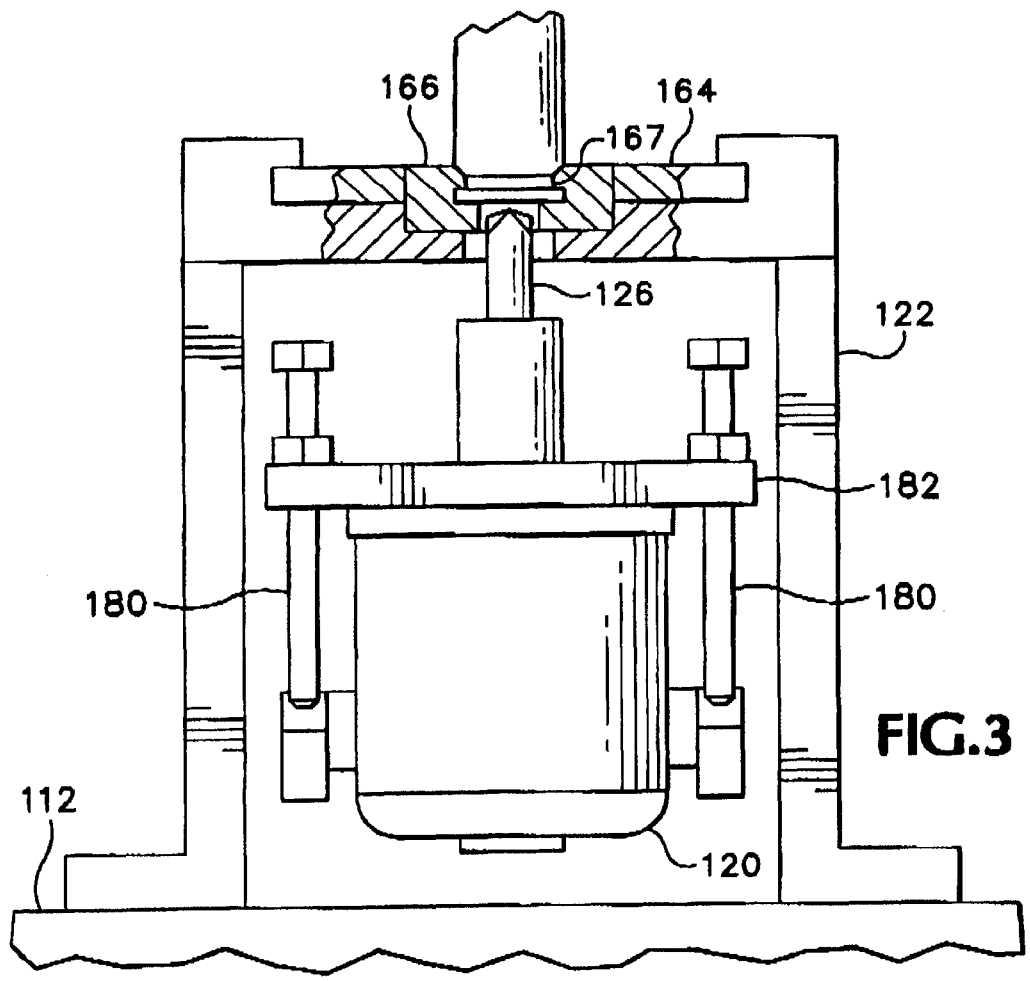
FIG. 3 is a partial front view of the machine of FIG. 1 taken along line 3—3 of FIG. 1.

Also attached to the carriage 146 is a downwardly depending linkage rod 150 that extends through an aperture (not shown) in a cartridge case retention assembly lever 152 and also through an aperture in a bottom motor movement lever 154. Both levers 152 and 154 are hinged to housing 122. Lever 152 is pushed by an upper spring 156, the top of which is fixed in position relative to rod 150 by a fixed washer 158. In turn, lever 154 is pushed by a bottom spring 160, the top of which is retained to lever 152. Linking element 162 is hinged both to lever 152 and to an apertured sliding plate 164. Referring to FIG. 2, a cartridge case retention element 166 accepts a cartridge case 10 with rim 167 fitting into groove 19. During machining, case 10 is held in place by a projecting portion 168 of sliding plate 164, which is slid into contact with cartridge case 10 by its operative connection to lever 152, whenever top lever 144 is pushed to the bottom of its range of motion.

Lever 154 abuts the bottoms of two posts 180 so that (see FIG. 5) when lever 154 is rotated about its hinge line by the downward action of rod 150, the two posts 180 are moved upwardly. In turn, posts 180 are rigidly connected to bottom motor 120 by way of a plate 182 that is rigidly connected to the top of bottom motor 120. Accordingly posts 180 lift motor 120 into case machining position when lever 144 is depressed.

The top machining unit 124 machines the neck 14, mouth 15 and flash hole 20 of the cartridge case 10. A machining shaft 202, includes an alignment tip 204 at its lower end, designed to enter and deburr the flash hole 20. The entrance of the alignment tip 204 into the flash hole 20 also ensures that the case 10 is aligned correctly for the machining of the primer pocket 18 by the primer pocket reamer 126. The primer pocket reamer 126 cuts both the sides and the bottom of the primer pocket 18 for uniform depth and thickness. The reamer 126 may include stop shoulders (not shown) to prevent machining in too deep.

Figures 4, 7:
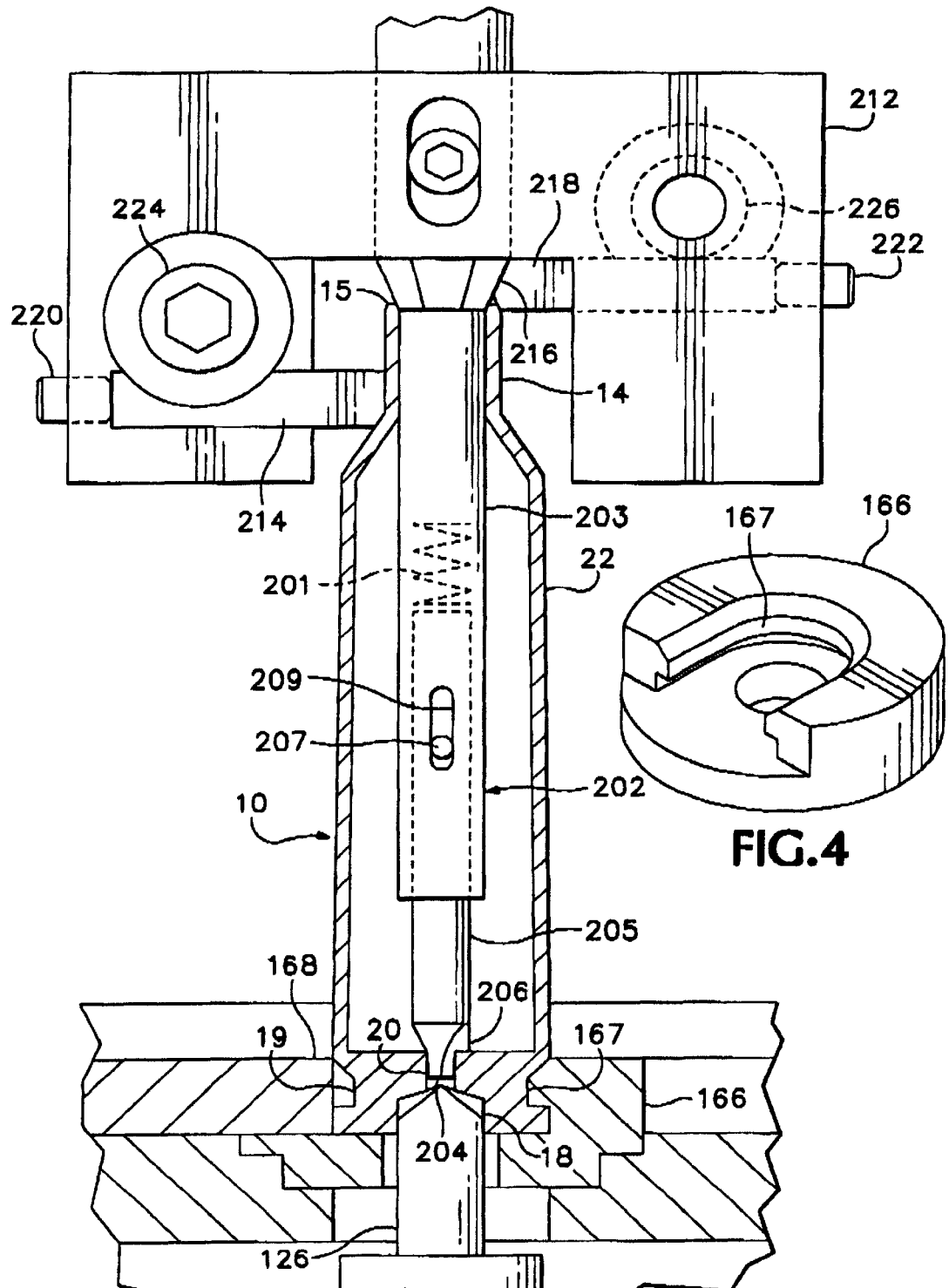
FIG. 4 is a perspective view of a cartridge case retention element that is a part of the machine of FIG. 1.
FIG. 7 is a side view of a smaller portion of the machine of FIG. 1, shown machining a cartridge case.
Figure 5:
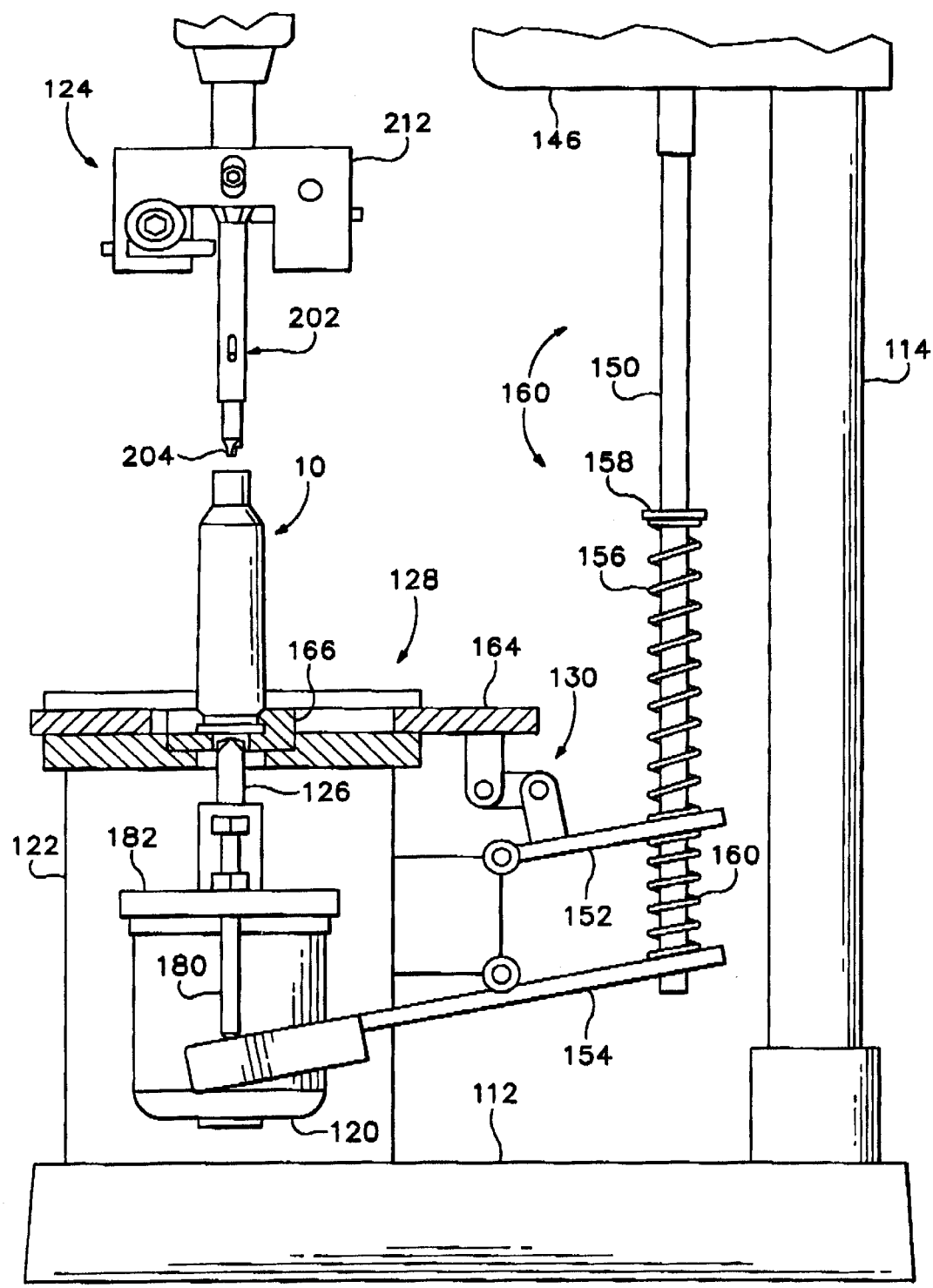
FIG. 5 is a side view of a portion of the machine of FIG. 1, shown in disengaged position.
Figure 6:
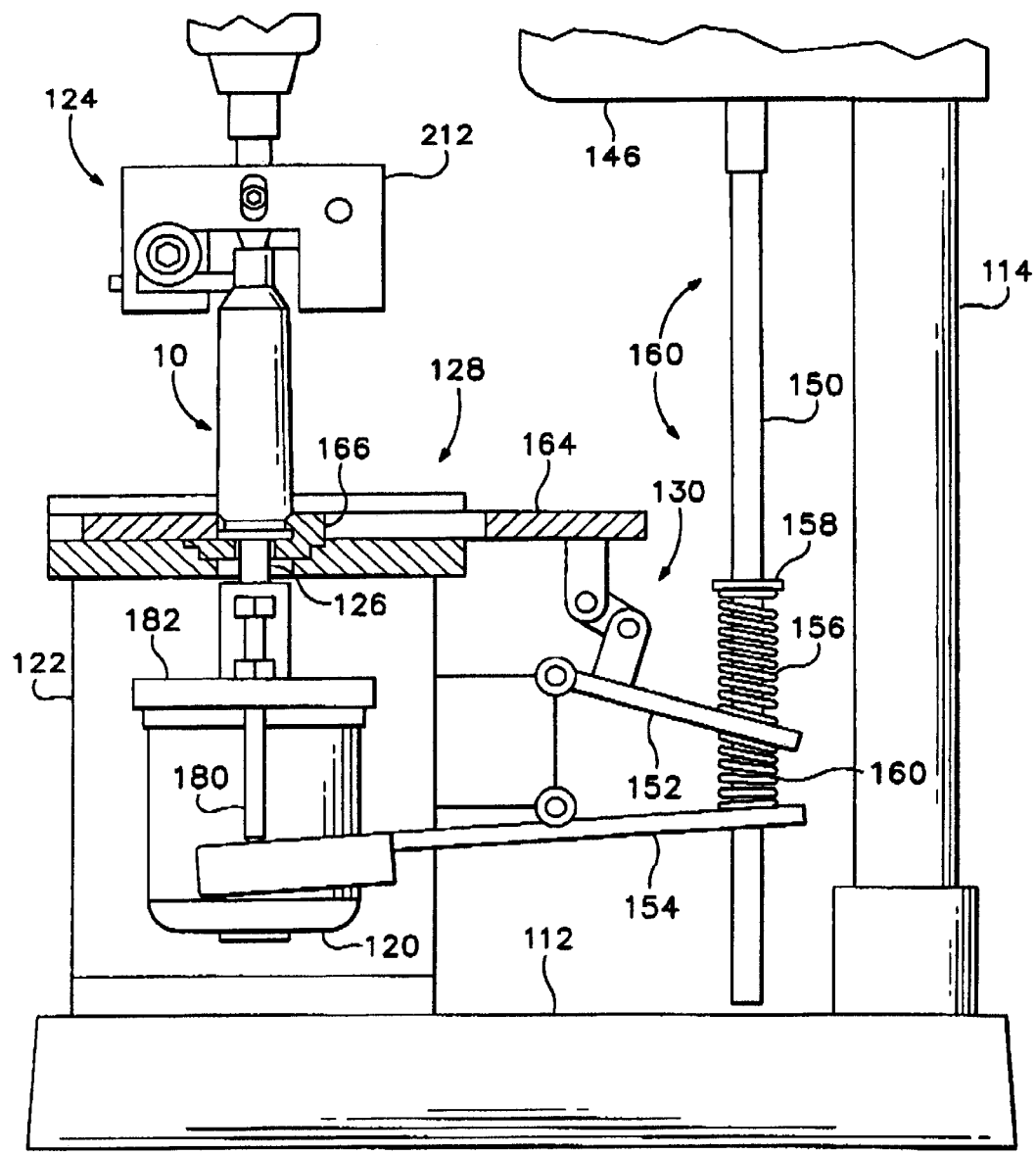
FIG. 6 is a side view of a portion of the machine of FIG. 1, shown machining a cartridge case.

Likewise, a stop shoulder 206 prevents alignment tip 204 from extending all the way through the flash hole 20, where it could contact the primer pocket reamer 126. In an alternative preferred embodiment, a roughened surface of shaft 202 reams out the interior of the neck 14 as it passes through. The machining shaft 202 is spring loaded and length adjustable, so that cartridge cases of varying lengths may be accommodated. In greater detail, referring to FIG. 7, a spring 201, set into an upper shaft portion 203 (of shaft 202) urges a bottom shaft portion 205 downwardly. A pin 207 in an oval window 209 limits the movement of the bottom portion 205.

The top machining unit 124 includes a bracket 212 and a position adjustable neck cutting bar 214 that contacts the neck 14 to cut away any excess brass. A downwardly pointed truncated cone section 216 of shaft 202 acts to chamfer the inner surfaces of the mouth of case 10. A mouth cutting bar 218 chamfers the outside of the cartridge case mouth. A pair of alien screws 220 and 222 provide for the adjustment of cutting bars 214 and 218 respectively. In addition, a pair of bolt assemblies 224 and 226 releasably retains cutting bars 214 and 218, respectively The terms and expressions which have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims which follow.

What is claimed is:

1. A device for machining a cartridge case that has a neck comprising a circular neck wall, a mouth and a primer pocket, said device comprising;
   a) a gripping assembly, adapted to accept and retain a cartridge case;
   b) a neck-machining assembly, positioned to engage said cartridge base from a first direction and adapted to machine said neck of said cartridge case;
   c) a primer pocket machining assembly, positioned to engage said cartridge case from a second direction, opposed to said first direction, thereby permitting simultaneous primer pocket and neck engagement, and adapted to machine said primer pocket; and
   d) an actuating assembly that includes an actuating member and wherein moving said actuating member in a predetermined manner causes said actuating assembly to cause said gripping assembly to grip said cartridge case, causes said neck-machining assembly to engage, and machine said neck and also causes said primer pocket machining assembly to engage and machine said primer pocket.

2. The device of claim 1 wherein said neck machining assembly includes an outside cutter adapted to thin and make uniform said circular neck wall.

3. The device of claim 1 wherein said neck machining assembly includes an inside reamer adapted to thin and make uniform said circular neck wall.

4. The device of claim 1 wherein said neck machining assembly includes a machining element and a rotational subassembly adapted to introduce relative rotation between said cartridge case and said machining element.

5. The device of claim 1 wherein said gripping assembly includes a cartridge case retention element and a plate defining an aperture and having a projection into said aperture and wherein said projection is pressed against said cartridge case to grip it during machining.

6. A device for machining a cartridge case that has a neck comprising a circular neck wall, a mouth and a primer pocket, said device comprising;
   a) a gripping assembly, adapted to accept and retain a cartridge case;
   b) a primer pocket machining assembly, positioned to engage said cartridge case and adapted to machine said primer pocket; and
   c) an actuating assembly that includes an actuating member and wherein moving said actuating member in a predetermined manner causes said actuating assembly to cause said gripping assembly to grip said cartridge case and also causes said primer pocket machining assembly to engage and machine said primer pocket.

7. The device of claim 6 wherein said primer pocket machining assembly includes a machining element and a rotational subassembly adapted to introduce relative rotation between said cartridge case and said machining element.

8. The device of claim 6 wherein said gripping assembly includes a cartridge case retention element and a plate defining an aperture and having a projection into said aperture and wherein said projection is pressed against said cartridge case to grip it during machining.

9. A device for machining a cartridge case that has a neck comprising a circular neck wall, a mouth and a flash hole, said device comprising;
   a) a gripping assembly, adapted to accept and retain a cartridge case;
   b) a neck-machining assembly, positioned to engage said cartridge case and to machine said neck of said cartridge case;
   c) a flash hole machining assembly, positioned to engage and machine said flash hole said flash hole machining assembly comprising a machining shaft having a length and including a device for automatically adjusting the length of said shaft for accommodating varying lengths in a set of cartridge cases; and
   d) an actuating assembly that includes an actuating member and wherein moving said actuating member in a predetermined manner causes said actuating assembly to cause said gripping assembly to grip said cartridge case and also causes said neck-machining assembly to engage and machine said neck and said flash hole machining assembly to engage and machine said flash hole.

10. The cartridge case machining assembly of claim 9 wherein said neck-machining assembly and said flash hole machining assembly engage said cartridge case from a single common direction.

11. The device of claim 9 wherein said machining shaft is spring loaded.

* * * * *

UNITED STATES PATENT AND TRADEMARK OFFICE
CERTIFICATE OF CORRECTION

PATENT NO. : 6,397,718 B2
DATED : June 4, 2002
INVENTOR(S) : John R. Jamison

It is certified that error appears in the above-identified patent and that said Letters Patent is hereby corrected as shown below:

Column 3,
Line 42, change "alien" to -- allen --.
Line 60, change "base" to -- case --.

Column 4,
Line 54, change "hole said" to -- hole, said --.

Signed and Sealed this

Twenty-seventh Day of August, 2002

Attest:

JAMES E. ROGAN
Attesting Officer  *Director of the United States Patent and Trademark Office*